US006305232B1

(12) United States Patent
Ohle et al.

(10) Patent No.: US 6,305,232 B1
(45) Date of Patent: Oct. 23, 2001

(54) METHOD OF DRY-CALIBRATING VORTEX FLOW SENSORS

(75) Inventors: Frank Ohle; Walter Bernet, both of Steinen; Joachim Maul, Weil am Rhein, all of (DE)

(73) Assignee: Endress + Hauser Flowtec AG, Reinach (CH)

(*) Notice: Subject to any disclaimer, the term of this patent is extended or adjusted under 35 U.S.C. 154(b) by 0 days.

(21) Appl. No.: 09/309,108

(22) Filed: May 10, 1999

Related U.S. Application Data
(60) Provisional application No. 60/091,280, filed on Jun. 30, 1998.

(30) Foreign Application Priority Data

May 14, 1998 (EP) .................................................. 98108753

(51) Int. Cl.[7] ...................................................... G01F 1/32
(52) U.S. Cl. ......................................... 73/861.22; 73/1.16
(58) Field of Search ........................... 73/861.22, 861.19, 73/1.16, 1.41, 1.56

(56) References Cited

U.S. PATENT DOCUMENTS 5,289,726 * 3/1994 Miau et al. ...................... 73/861.22

FOREIGN PATENT DOCUMENTS 195 06 167   8/1996 (DE) .
0 841 545   10/1997 (EP) .

OTHER PUBLICATIONS

Takamoto, M.and Terao, Y., "Development of a Standard Vortex Shedding Flowmeter", Bulletin of NRLM 45 (1996) 2, pp. 174–179.
Mayinger, Franz, "Optical Measurements", 1994, pp. 371–424 (Plus nonenclatur 433–435).

* cited by examiner

Primary Examiner—Harshad Patel
(74) Attorney, Agent, or Firm—Bose McKinney & Evans LLP

(57) ABSTRACT

To achieve accuracies of the order of 0.75% of the measured value, a digitized, two-dimensional overall image of a bluff body (7), of the internal surface of a measuring tube (2) in the area of the bluff body, of the two fixing zones (71, 72) of the bluff body, and of contour line (51) of the inlet end (5) of the measuring tube is generated by a high-resolution electronic camera (9) located in front of the measuring tube (2) on the axis (3) of this tube. The overall image is divided into three partial images. The first partial image contains only information about the inlet end (5) and the internal surface (4) of the measuring tube, the second contains only information about the bluff body (7) without the fixing zones (71, 72), and the third contains only information about the fixing zones. From shape information about the fixing zones (71, 72) and ideal information characteristic of the ideal shapes of the fixing zones, cross-correlation information is formed. In a neural network (22), all information and corresponding standard information derived from a plurality of wet calibrations are processed into calibration factor information and/or dimension information about the geometrical dimensions of the calibrated vortex sensor.

4 Claims, 4 Drawing Sheets

METHOD OF DRY-CALIBRATING VORTEX FLOW SENSORS

This application claims benefit of Provisional No. 60/091,280 filed Jun. 30, 1998.

FIELD OF THE INVENTION

This invention relates to a method of dry-calibrating vortex flow sensors, hereinafter called "vortex sensors" for short.

BACKGROUND OF THE INVENTION

The operation of conventional vortex sensors, as is well known, is based on the utilization of periodic pressure fluctuations in a Karman vortex street. Such a vortex street is formed when a fluid in a measuring tube flows against an obstruction, particularly a bluff body. From the downstream side of the body, vortices are shed, which form the vortex street. The frequency of vortex shedding is proportional to the volumetric flow rate of the fluid.

A conventional vortex sensor comprises the aforementioned bluff body and a measuring tube of predetermined length through which the fluid to be measured flows during operation. The measuring tube has an axis, an internal surface, an inlet end, an outlet end, a bore size corresponding to a nominal bore ordered by a customer, and a wall thickness suitable for a permissible pressure.

The bluff body has a horizontal cross-sectional area with a geometrical shape that can be selected by the manufacturer. It further has a first end and a second end which are connected with the wall of the measuring tube along a first fixing zone and a second fixing zone, respectively. The bluff body has a surface facing fluid flow and having a first and a second vortex-shedding edge, and is commonly disposed along a diameter of the measuring tube. The bluff body may have further vortex-shedding edges, particularly a third and a fourth vortex shedding edge.

A sensing element is fitted in the bluff body or is mounted downstream of the bluff body on the internal or external surface of the wall of the measuring tube or in this wall. The electric signals generated by the sensing element are processed by evaluation electronics and indicated and/or passed on to further electronics in the usual manner.

A characteristic feature of bluff bodies is that they have a surface facing fluid flow, at which the fluid is "dammed up". On the downstream side, the bluff bodies taper so as to obtain at least the first and second vortex-shedding edges and favor the vortex shedding.

The pressure variations associated with the vortices are converted into electrically processable signals by means of the sensing element mounted in or downstream of the bluff body, which may be a capacitive, inductive, or piezoelectric device, but also an ultrasonic transducer, for example. The frequency of these signals is directly proportional to the volumetric flow rate in the measuring tube.

Due to variations in the geometrical dimensions of produced vortex sensors, however, each of these devices must be calibrated individually, i.e., each device is measured in a calibration facility using a standard fluid, generally water. For this calibration measurement, the term "wet calibration" has come into use.

This is usually done by presetting several precisely known flow-rate values ("calibration values") by means of the calibration facility and registering the associated values indicated by the respective vortex sensor via the associated evaluation electronics. The deviation of the registered values from the precise values yields a calibration factor characteristic of the respective flow sensor.

The calibration factor is used, inter alia, to adjust a variable-gain amplifier stage in the evaluation electronics of the respective vortex sensor so that the indicated flow-rate values of all produced vortex sensors are equal to one another and to the above-defined calibration values.

The wet calibration described is complicated, time-consuming, and expensive. In the literautre, cf. "Bulletin of NRLM", Vol. 45, 1996, pages 174 to 179, a concept is described for dry-calibrating the produced vortex sensors based on determined physical dimensions and an experimentally optimized geometry of the individual bluff bodies. This optimization consists of determining that bluff body geometry for which the dependence of the Strouhal number on the Reynolds number is as linear as possible.

However, this method of dry calibration is not accurate enough since manufacturing tolerances of the bluff bodies and of other parts of the flow sensors are not taken into account. Furthermore, this method does not allow the use of bluff body shapes that may be necessary for other reasons. Moreover, present-day accuracy requirements, which are of the order of 0.75% of the measured value, cannot be met with the prior-art method.

It is therefore an object of the invention to provide a method of dry calibration which is much more accurate than the prior-art method.

To attain this object, the invention provides a method of dry-calibrating vortex sensors each comprising:

a measuring tube of predetermined length having a lumen
through which a fluid whose volumetric flow rate is to be measured flows during operation, and
which has an axis,
an internal surface,
an inlet end, which forms a contour line with the lumen,
an outlet end,
a bore size corresponding to a nominal bore, and
a wall thickness suitable for a permissible pressure of the fluid;

a bluff body
which has a cross-sectional area with a geometrical shape selectable by the manufacturer,
which has a first end connected with the wall of the measuring tube along a first fixing zone and a second end connected with the wall of the measuring tube along a second fixing zone,
which has a surface facing fluid flow and having a first and a second vortex-shedding edge, and
which is disposed along a diameter of the measuring tube; and a sensing element
which is fitted in the bluff body or
which is mounted downstream of the bluff body on the internal or external surface of the wall of the measuring tube or in said wall, said method comprising the steps of:
producing, by means of a high-resolution electronic camera located on the axis in front of the measuring tube, in the direction of fluid flow, a digitized, two-dimensional overall image of the internal surface of the measuring tube in the area of the bluff body, the bluff body, the two fixing zones, and the contour line of the inlet end;

dividing the overall image into a first, a second, and a third partial image, the first partial image containing virtually only information about the inlet end and the internal surface,
the second partial image containing virtually only information about the bluff body without the fixing zones, and
the third partial image containing virtually only information about the fixing zones;

extracting from the first partial image
contour information about the contour line and
first surface defect information relating to the internal surface of the measuring tube;

extracting from the second partial image
first edge information about the first vortex-shedding edge of the bluff body,
second edge information about the second vortex-shedding edge of the bluff body, and
second surface defect information relating to the surface of the bluff body facing fluid flow;

extracting from the third partial image
first shape information about the first fixing zone of the bluff body,
second shape information about the second fixing zone of the bluff body,
third surface defect information relating to the surface of the first fixing zone, and
fourth surface defect information relating to the surface of the second fixing zone;

forming from the first and second edge information
distance information and
angle information relating to the deviation of the vortex-shedding edges of the bluff body from parallelism;

forming from the distance information
first roughness information relating to the not exactly straight course of the first vortex-shedding edge,
second roughness information relating to the not exactly straight course of the second vortex-shedding edge,
mean-value information for all distances between the vortex-shedding edges along the bluff body, and
weighting information using a weighting function characteristic of predetermined flow profiles of the fluid;

forming first cross-correlation information from the first shape information and from first ideal information characteristic of the ideal shape of the first fixing zone, and
forming second cross-correlation information from the second shape information and from second ideal information characteristic of the ideal shape of the second fixing zone; and processing in a neural network
the contour information,
the first and second roughness information,
the mean-value information,
the weighting information,
the angle information,
the first, second, third, and fourth surface defect information, and
the first and second cross-correlation information
together with respective standard information corresponding to said information and derived from a plurality of wet calibrations into
calibration factor information and/or
dimension information about the geometrical dimensions of the calibrated vortex sensor.

A first preferred embodiment of the invention comprises the steps of:

forming from the distance information standard deviation information relating to all distances between the vortex-shedding edges of the bluff body;

forming by means of a multiple comparator
contour reference information from the contour information and a contour limit value to be predetermined therefor,
first roughness reference information from the first roughness information and a first roughness limit value to be predetermined therefor,
second roughness reference information from the second roughness information and a second roughness limit value to be predetermined therefor,
standard deviation reference information from the standard deviation information and a standard deviation limit value to be predetermined therefor,
first cross-correlation reference information from the first cross-correlation information and a first cross-correlation limit value to be predetermined therefor,
second cross-correlation reference information from the second cross-correlation information and a second cross-correlation limit value to be predetermined therefor,
first surface defect reference information from the first surface defect information and a first surface defect limit value to be predetermined therefor,
second surface defect reference information from the second surface defect information and a second surface defect limit value to be predetermined therefor,
third surface defect reference information from the third surface defect information and a third surface defect limit value to be predetermined therefor, and
fourth surface defect reference information from the fourth surface defect information and a fourth surface defect limit value to be predetermined therefor; and processing the calibration factor information,
the dimension information,
the contour reference information,
the standard deviation reference information,
the first roughness reference information,
the second roughness reference information,
the first cross-correlation reference information,
the second cross-correlation reference information,
the first surface defect reference information,
the second surface defect reference information,
the third surface defect reference information, and
the fourth surface defect reference information into quality information and/or quality factor information.

In a second preferred embodiment of the invention, which can also be used with the first preferred embodiment,
the bluff body has, in addition to the first and second vortex-shedding edges, a third and a fourth vortex-shedding edge;
from the distance information,
third roughness information relating to the not exactly straight course of the third vortex-shedding edge and
fourth roughness information relating to the not exactly straight course of the fourth vortex-shedding edge
is formed; and
in the neural network, the third and fourth roughness information is processed together with corresponding standard information derived from a plurality of wet calibrations into the calibration factor information and/or the distance information.

One advantage of the invention is that the accuracy of the calibration is very good, namely of the desired order of 0.75% of the measured value.

BRIEF DESCRIPTION OF THE DRAWINGS

The invention and further advantages will become more apparent from the following description of embodiments when taken in conjunction with the accompanying drawings, which are not true to scale, and in which.

DETAILED DESCRIPTION OF PREFERRED EMBODIMENTS

Figure 1:
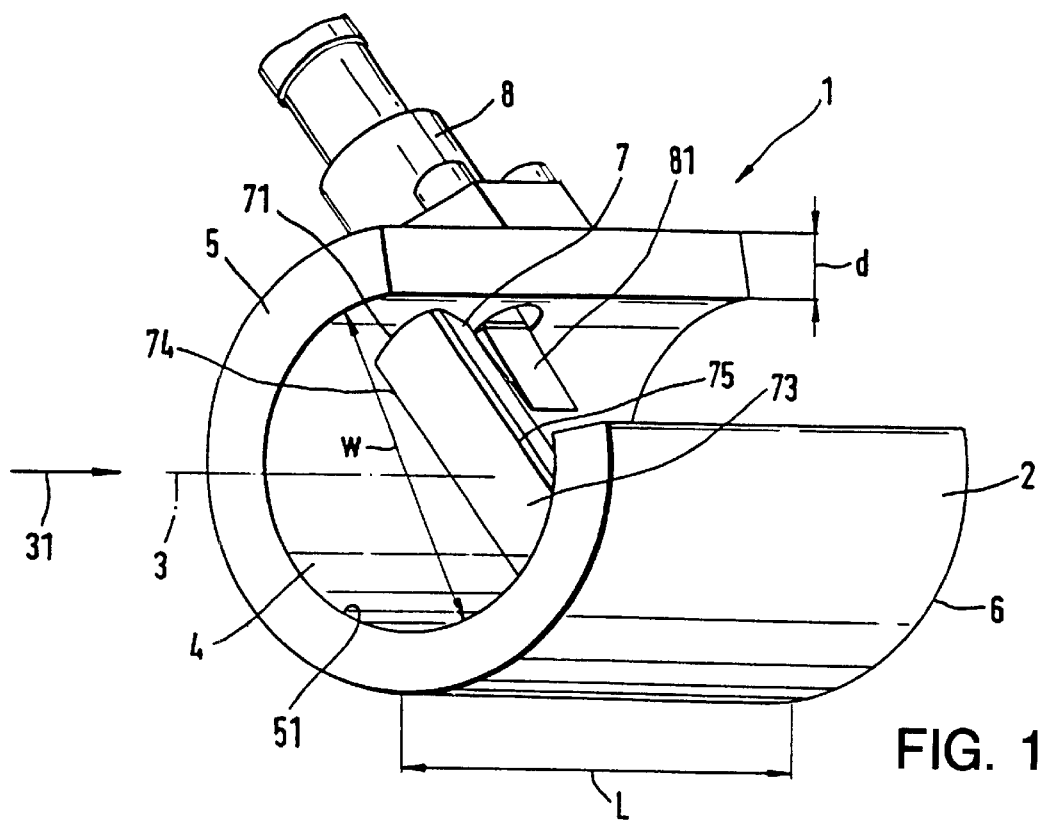
FIG. 1 shows the construction of a vortex sensor in a schematic, partly sectioned perspective view from below.
Figure 2:
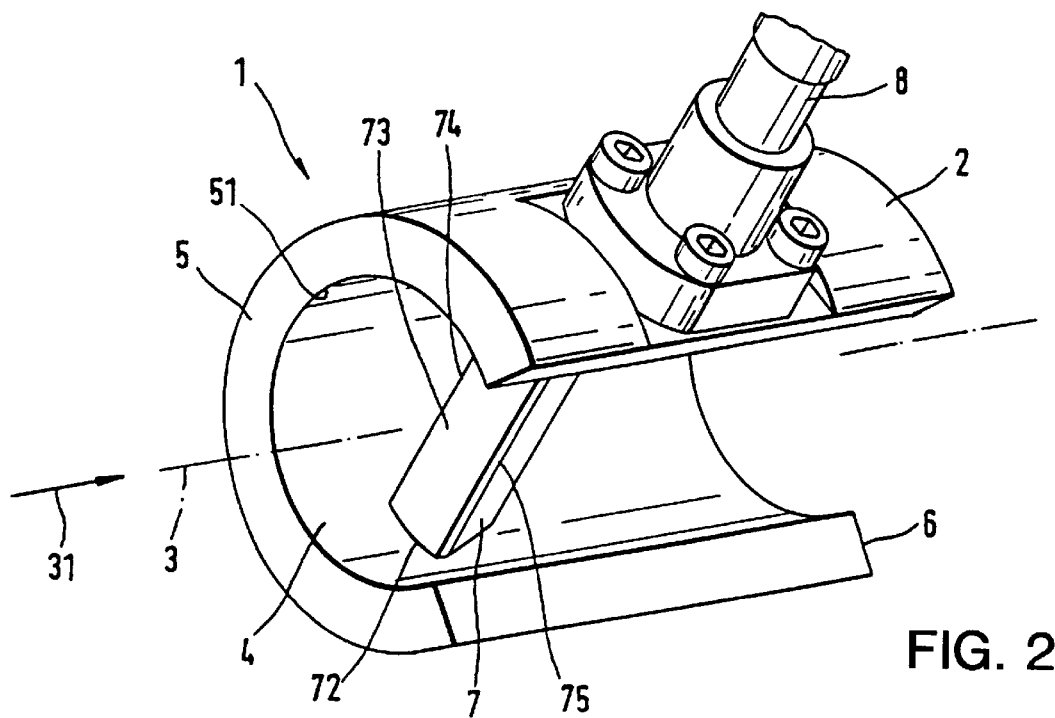
FIG. 2 shows the vortex sensor of FIG. 1 in a schematic, partly sectioned perspective view from above.

FIGS. 1 and 2 show the construction of a conventional vortex sensor 1. To make visible all details which are essential for the invention, perspective views have been chosen in FIGS. 1 and 2, namely a view from below in FIG. 1 and a view from above in FIG. 2.

The vortex sensor 1 comprises a measuring tube 2 of a length L predetermined by the manufacturer. In operation, a fluid to be measured flows through the measuring tube 2. This fluid may be a liquid, a gas, or a vapor. The measuring tube 2 is commonly made of a suitable metal, such as high-grade steel or cast iron, but it may also be made of a suitable hard plastic.

The measuring tube 2 has an axis 3, an internal surface 4, an inlet end 5, and an outlet end 6. Thus, the direction of fluid flow is fixed; in FIGS. 1 and 2, this is the direction from the left to the right, as is indicated by the arrow 31.

The measuring tube 2 further has a bore size w and a suitable wall thickness d. These two values are dependent on the nominal bore and the permissible fluid pressure of the vortex sensors produced.

If the measuring tube 2 has a circular cross section as is shown in FIGS. 1 and 2, the bore size w is the diameter of the lumen of the measuring tube 2. The lumen and the inlet end form a contour line 51; this contour line is usually a circle, since the inlet end 5 is flat and lies in a plane perpendicular to the axis 3.

A bluff body 7 has the shape of a right prism with a prism axis and a cross-sectional area which has a geometrical shape to be selected by the manufacturer and which is perpendicular to the prism axis. In FIGS. 1 and 2, this geometrical shape is essentially an isosceles triangle. Instead of a right prism, right circular cylinders have been described as bluff bodies in the prior art.

The bluff body 7 has a first end and a second end which are permanently connected with the internal surface 4 of the wall of the measuring tube 2 along a first fixing zone 71 and a second fixing zone 72, respectively. This permanent connection is generally made by welding, since the measuring tube 2 is usually made of steel.

The bluff body 7 has a surface 73 facing fluid flow and having a first vortex-shedding edge 74 and a second vortex-shedding edge 75, and is generally disposed along a diameter of the measuring tube 2. It may also have a third and a fourth vortex-shedding edge.

A sensing element is fitted in the bluff body or is mounted downstream of the bluff body on the internal or external surface of the wall of the measuring tube or in the wall, or it extends through the wall. The sensing element may be, for example, a capacitive, inductive, or piezoelectric device, but it may also be an ultrasonic transducer. FIGS. 1 and 2 show the variant in which a sensing element 8 was passed through the wall from outside. The sensing element 8 ends in a paddle 81 extending into the fluid.

The pressure fluctuations associated with the vortices move the paddle 81 back and forth in a direction perpendicular to the surface visible in FIG. 1. As mentioned above, the electric signals generated by the sensing element 8 are processed by the evaluation electronics and are indicated and/or passed on in the usual manner. The evaluation electronics do not form part of the invention, so that they need not be explained here, the less so since numerous evaluation electronics are described in the prior art.

Figure 3:
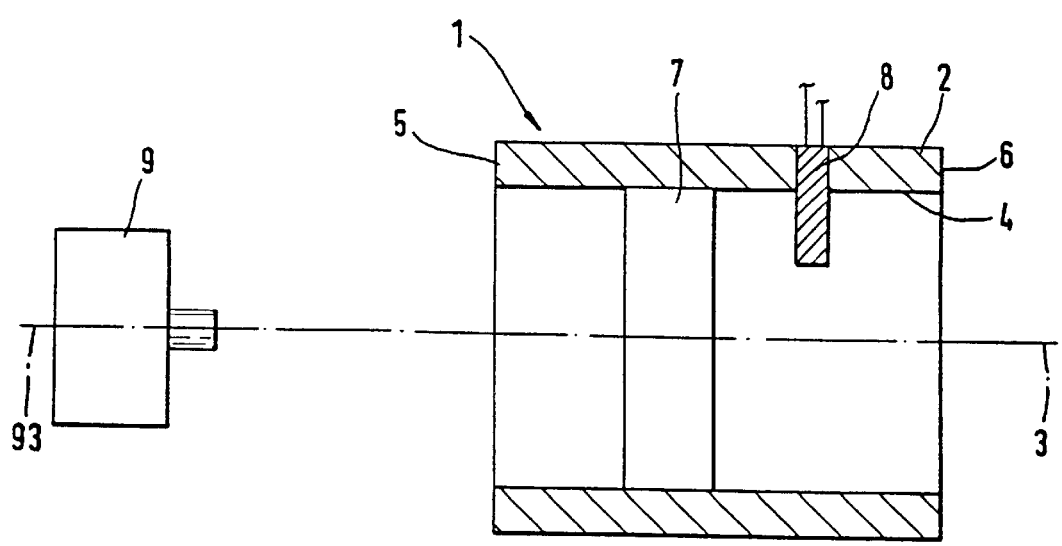
FIG. 3 shows a high-resolution electronic camera in front of the inlet end of the vortex sensor of FIGS. 1 and 2 in a highly schematic longitudinal section.

FIG. 3 shows a high-resolution electronic camera 9 in front of the inlet end of the vortex sensor of FIGS. 1 and 2 in a schematic longitudinal section. In FIG. 3, the camera 9 is so positioned that its optical axis 93 coincides with the axis 3 of the vortex sensor.

This need not necessarily be so. The camera 9 may also be so positioned in front of the inlet end 5 that the optical axis 93 and the axis 3 form an angle in a plane which contains the two axes 3, 93 and is perpendicular to the prism axis of the bluff body 7.

In these swiveled positions of the camera 9, it is possible, for example, to dry-calibrate vortex sensors having a bluff body which has, in addition to the first and second vortex-shedding edges, a third and a fourth vortex-shedding edge. How the dry-calibration electronics are designed in that case is explained below.

The two-dimensional images formed in the swiveled positions of the camera 9 may be subjected to conventional tomography algorithms as are described, for example, in a book by F. Mayinger, "Optical Measurements", Berlin 1994, ISBN 3-540-56765-8 and 0-387-56765-8, Chapter 17, pages 371 to 424.

Using these algorithms, tomographic images of planes perpendicular to the prism axis of the bluff body 7 can be formed, from which three-dimensional images can be constructed. From the latter, calibration and/or quality information is then generated in accordance with the invention.

Figure 4:
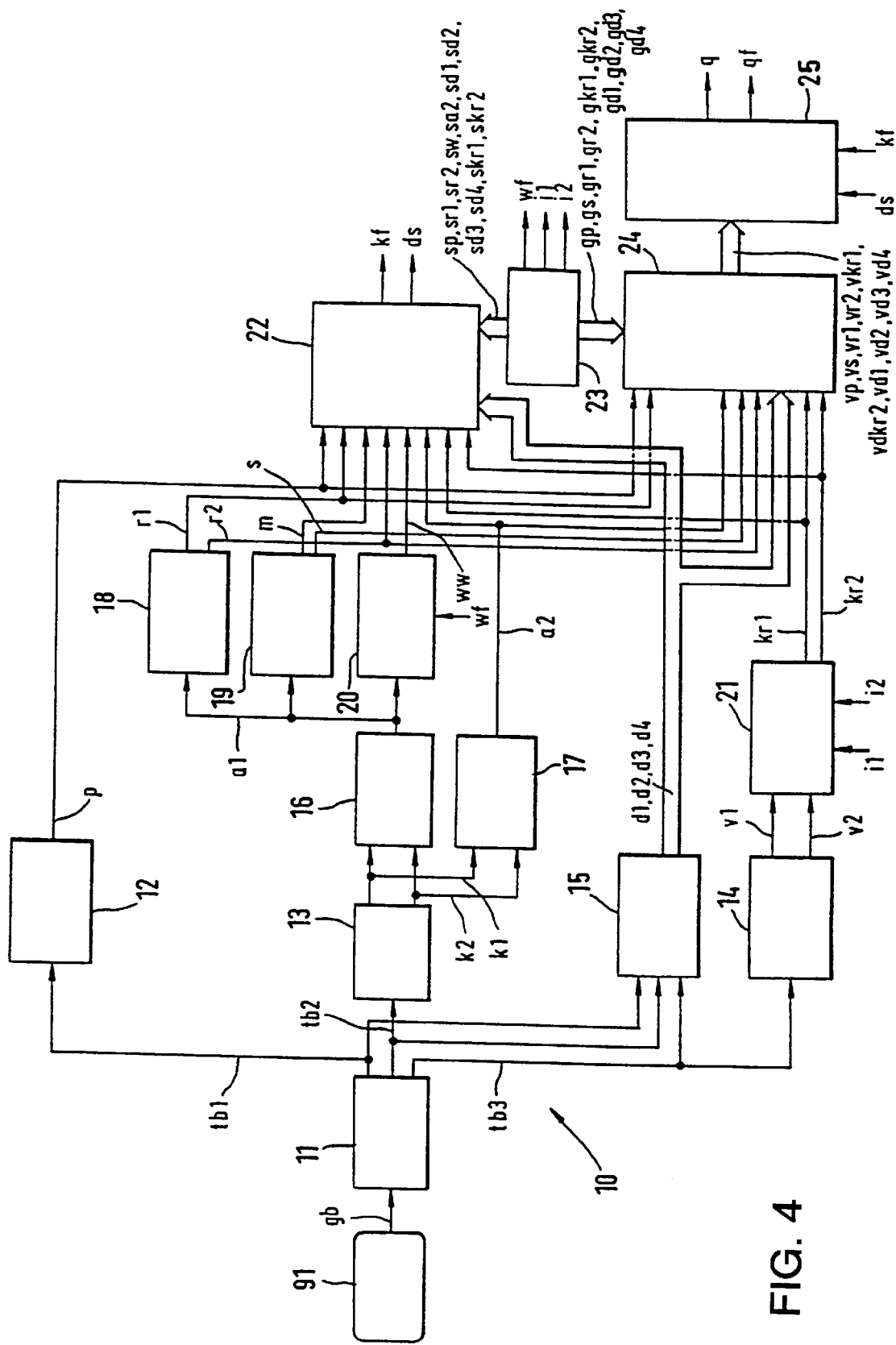
FIG. 4 shows in block-diagram form a preferred embodiment of dry-calibration electronics, with the camera and the vortex sensor positioned as shown in FIG. 3.

FIG. 4 shows, in block-diagram form, preferred dry-calibration electronics 10 together a further development of the invention for an arrangement of camera 9 and vortex sensor 1 as shown in FIG. 3. The camera 9 points in the direction of fluid flow, and its camera electronics 91 produces, in the form of an overall-image signal gb, a digitized, two-dimensional overall image of the following parts of the vortex sensor 1: the bluff body 7, the internal surface 4 of the measuring tube 2 in the area of the bluff body 7, the two fixing zones 71, 72, and the contour line 51 of the inlet end 5.

The dry-calibration electronics 10 first divide the overall image into first, second, and third subimages by separating the overall-image signal gb into the following signals in a segmenting stage 11: a first partial-image signal tb1, containing virtually only information about the inlet end 5 and the internal surface 4 of the measuring tube 2, a second partial-image signal tb2, containing virtually only information about the bluff body 7 without the fixing zones 71, 72, and a third partial-image signal tb3, containing virtually only information about the fixing zones 71, 72.

From the first partial image, the dry-calibration electronics 10 extract contour information about the contour line 51 of the inlet end 5 by forming a contour signal p from the partial-image signal tb1 in a contour selection stage 12. This contour signal p also includes information on the bore size w of the measuring tube 2. If necessary, a signal containing information on the bore size w can be generated from the contour signal p.

From the second partial image, the dry-calibration electronics 10 extract first edge information about the first vortex-shedding edge 74 of the bluff body 7 and second edge information about the second vortex-shedding edge 75 of the bluff body. This is accomplished by forming a first vortex-shedding edge signal ki and a second vortex-shedding edge signal k2 from the partial-image signal tb2 in a vortex-shedding edge selection stage 13.

From the third partial image, the dry-calibration electronics 10 extract first shape information about the first fixing zone 71 of the bluff body 7 and second shape information about the second fixing zone 72 of the bluff body. This is accomplished by forming a first shape signal vi and a second shape signal v2 from the partial-image signal tb3 in a shape selection stage 14.

The dry-calibration electronics 10 extract first surface defect information relating to the internal surface 4 of the measuring tube 2 from the first partial image, second surface defect information relating to the surface of the bluff body facing fluid flow, 73, from the second partial image, as well as third surface defect information relating to the surface of the first fixing zone 71 and fourth surface defect information relating to the surface of the second fixing zone 72 from the third partial image. This is accomplished by generating first, second, third, and fourth defect signals d1, d2, d3, d4 in a defect detection stage 15.

From the first and second edge information, the dry-calibration electronics 10 form distance information and angle information relating to the deviation of the edges of the bluff body from parallelism by generating from the first and second vortex-shedding edge signals k1, k2 a distance signal a1 in a distance detection stage 16 and an angle signal a2 in an angle detection stage 17.

From the distance information, the dry-calibration electronics 10 form the following further information: first roughness information relating to the not exactly straight course of the first vortex-shedding edge, second roughness information relating to the not exactly straight course of the second vortex-shedding edge, mean-value information for all distances between the vortex-shedding edges along the bluff body, standard deviation information for all these distances, and weighting information based on a weighting function characteristic of flow profiles of the fluid that occur in operation. A turbulent flow profile, for example, may be taken as a basis.

This is accomplished by generating first and second roughness signals r1, r2 from the distance signal a1 in a roughness detection stage 18, a mean-value signal m and a standard deviation signal s in an averager 19, and a weighting signal ww in a weighting stage 20.

The weighting stage 20 receives a weighting-function signal wf which is characteristic of the fluid flow profiles occurring or to be expected in operation. The weighting-function signal wf is selected by a control signal from an "ensemble" of weighting-function signals. The ensemble is stored in a first area of a memory 23 forming part of the dry-calibration electronics 10, and comprises all weighting-function signals wf that belong to flow profiles occurring or to be expected during operation of the vortex sensor 1.

The dry-calibration electronics 10 form first cross-correlation information from the first shape information and from first ideal information characterizing the ideal shape of the first fixing zone 71 of the bluff body 7, and second cross-correlation information from the second shape information and from second ideal information characterizing the ideal shape of the second fixing zone 72 of the bluff body 7.

This is accomplished by generating, in a cross-correlation stage 21, a first cross-correlation signal kr1 from the first shape signal v1 and from a first ideal signal ii characteristic of the ideal shape of the first fixing zone 71 of the bluff body 7, and a second cross-correlation signal kr2 from the second shape signal v2 and from a second ideal signal i2 characteristic of the ideal shape of the second fixing zone 72 of the bluff body 7.

The cross-correlation stage 21 receives the ideal signals i1, i2, which are stored, for example, in a second area of the memory 23. The ideal signals i1, i2 can be calculated from the known ideal shapes of the fixing zones 71, 72 and then be stored in the second memory area.

In a neural network 22, the dry-calibration electronics 10 process the contour information, the first and second roughness information, the mean-value information, the angle information, the weighting information, the first, second, third, and fourth surface defect information, and the first and second cross-correlation information together with respective corresponding standard information derived from a plurality of wet calibrations into calibration factor information and/or dimension information about the geometrical dimensions of the respective calibrated vortex sensor.

Before describing how this is accomplished in the circuit of FIG. 4, the basic operation of neural networks will be explained.

Unlike a conventional processor, which processes digital data using a programmed, fixed algorithm, a neural network, also referred to as an artificial neural network (ANN), is a data processing structure which can process the data according to an algorithm that generates itself during the data processing, namely by interaction between known data, the so-called training data and test data, and a learning rule in a training phase.

Neural networks are therefore suited for processing data if no fixed algorithm is generable, for example because no statistical method or no model is available. Thus, neural networks are particularly suitable if many data about a desired behavior of a system are available, if the data to be processed are noisy, or if structuring and/or compression of the data and/or feature extraction are necessary.

A neural network is a multiprocessing system comprising simple processing elements, the so-called neurons, and an interconnection network which connects the neurons with one another by a plurality of signal channels called "connections". The scalar combination of a neuron with all other neurons is referred to as a propagation function. The adaptive interaction of the neurons based on a learning rule is referred to as training.

Neurons of simple design collect data of a plurality of adjacent neurons, to which they are coupled via weighted connections, and combine these data according to simple rules. Thus, although the individual neuron is not very complex, the performance of the neural network as a whole is significantly enhanced by the interconnection of many neurons.

Figure 5:
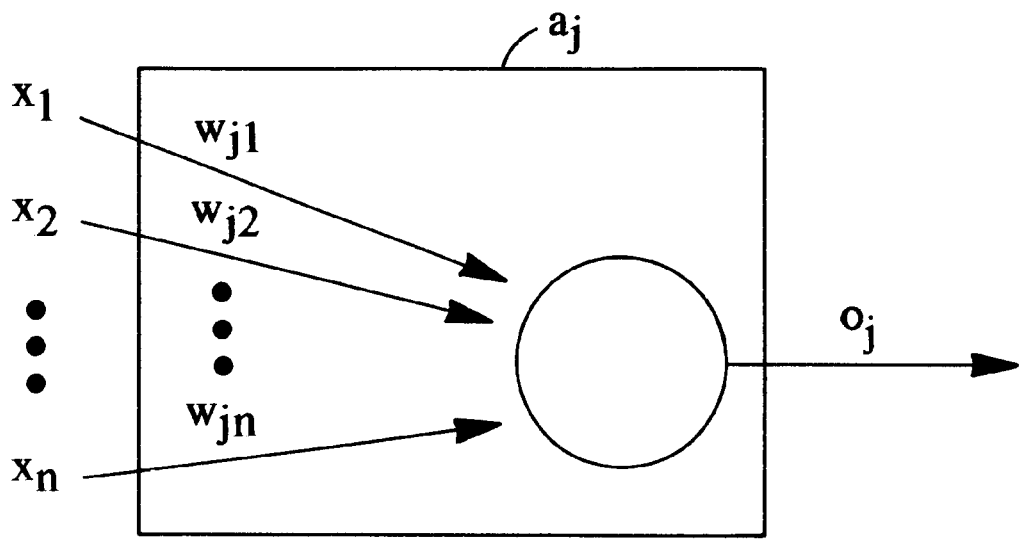
FIG. 5 shows schematically the model of a neuron of a neural network.

FIG. 5 shows schematically the model of a neuron $a_j$. The neuron $a_j$ has a plurality of inputs $x_1, x_2, \ldots, x_n$ and a single output $o_j$ for output values. The inputs receive input data, e.g. measured values of a physical quantity, which are referred to as an "input pattern" or "input vector".

The behavior of the neuron $a_j$ is determined by two processing steps. First, the weighted sum of all input data is formed using weighting factors $w_{j1}, w_{j2}, \ldots, w_{jn}$, which are indicated in FIG. 5 by arrows. From this weighted sum and from a previous (earlier) activation state, a current (new) activation state and a corresponding output value at the output $o_j$ are generated by means of an activation function.

The activation function is generally a function contained in an exponential term, such as a sigmoid function of the form $f(z)=1/(1+e^{-z})$, where z is the above-mentioned weighted sum. The activation state may be limited to a range of values between 0 and 1 or between −1 and +1. It is also possible to define a threshold value so that output signals will be transferred to the output only if they are greater than or equal to the threshold value. The activation function can also be a Gaussian curve for z.

Figure 6:
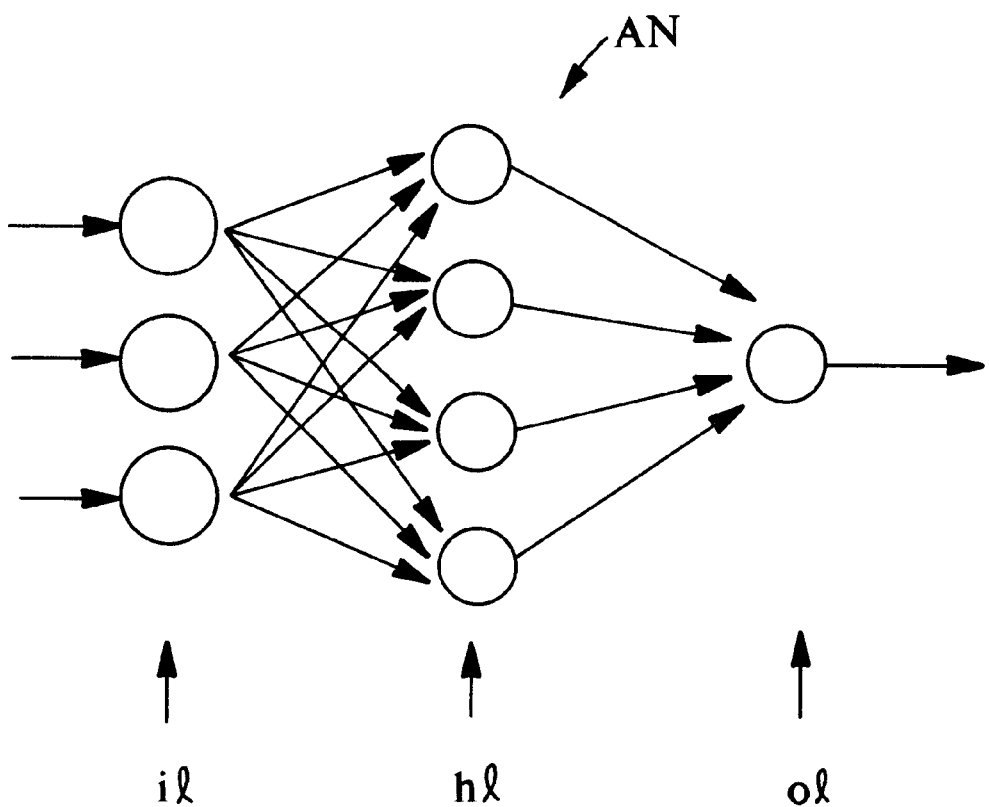
FIG. 6 shows schematically a simple neural network consisting of eight neurons according to FIG. 5.

FIG. 6 shows schematically the structure of a simple neural network AN comprising eight neurons, which are symbolized by circles. Each neuron contributes to the input/output behavior of the neural network. The neural network has a input layer il, a hidden layer hl, and an output layer ol.

The hidden layer hl may consist of several layers and has no direct connections from or to the outside of the neural network. There are also neural networks without a hidden layer. The input layer and the hidden layer each consist of several neurons, while the output layer contains at least one neuron. The number of neurons in the output layer is equal to the number of types of output values of the neural network to be generated.

Each of these types of output values is composed of m classes of adjacent output values; "adjacent" as used here means that the output values belonging to a class differ only by a predetermined maximum value.

In FIG. 6, connections exist only from the input layer to the hidden layer and from the hidden layer to the output layer, i.e., there are no feedback connections and no connections between neurons of the same layer. In principle, however, feedback connections and/or connections between neurons of the same layer are possible.

In the training phase, the algorithm is generated on the basis of the training data fed to the input layer and on the basis of the aforementioned m classes, i.e., the training data are mapped onto the m classes and thus classified.

This is done by iteratively adjusting, and thus optimizing, the weighting factors $w_{j1}, w_{j2}, \ldots, w_{jn}$ of the individual neurons and, if necessary, the associated threshold values according to the learning rule in such a way as to minimize an error between the respective predetermined class and the class to which the training data are currently assigned by the neural network.

In the invention, the training data and the test data are records that were determined from at least one common property, preferably from several properties, of a fixed number n of vortex sensors using the electronic camera 9 and the dry-calibration electronics 10. This common property or these common properties are one or more of the above-mentioned quantities defining the three-dimensional shape of the vortex sensors. Corresponding signals are referred to in the following as standard signals.

For the n vortex sensors, at least one quantity influencing the respective volumetric flow rate value, e.g. the calibration factor, is known and lies within a selected range of values, i.e., within a calibration factor range, for example. This quantity must be measured with a high degree of accuracy, e.g. by wet calibration. This measurement provides n single values of this quantity lying within the range of values, i.e., n single values of the calibration factor, for example.

As training data, a maximum of n-1 records are used, while the test data are the record or records not used as training data. The training data are fed to the input layer of the neural network and thus classified as mentioned. According to the learning rule, several iterations are carried out with the training data.

In the test phase following the training phase, the test data fed to the input layer are used to determine whether the learned algorithm generates the quantity influencing the measured volumetric flow-rate value, e.g. the calibration factor, with sufficient accuracy.

So much on the basic properties of neural networks.

In the working phase, the following signals are fed to the input layer of the neural network 22: the contour signal p, the roughness signals r1, r2, the mean-value signal m, the weighting signal ww, the angle signal a2, the surface defect signals d1, d2, d3, d4, and the cross-correlation signals kr1, kr2.

Before that, respective standard signals corresponding to these signals were applied as training and test data.

These are: a standard contour signal sp, a first and a second standard roughness signal sr1, sr2, a standard weighting signal sw, a standard angle signal sa2, a first, a second, a third, and a fourth standard surface defect signal sd1, sd2, sd3, sd4, and a first and a second standard cross-correlation signal skr1, skr2. Corresponding standard signals must be determined at the above-mentioned n vortex sensors for each nominal vortex sensor bore to be produced and for each intended shape of the bluff body. The standard signals sp, sr1, sr2, sw, sa2, sd1, sd2, sd3, sd4, skr1, skr2 are stored in a third area of the memory 23.

At the output of the neural network 22, a calibration factor signal kf and a dimension signal ds containing information on the geometrical dimensions of the respective calibrated vortex sensor are provided. These signals can then be used in a suitable manner. They are stored, for example, in a nonvolatile, but programmable memory. The calibration factor signal kf serves to adjust or program the evaluation electronics of each individual vortex sensor in such a manner that all produced vortex sensors deliver identical indication signals for identical volumetric flow-rate values.

FIG. 4 also shows a further development of the invention. The dry-calibration electronics 10 have been expanded by addition of this further development such that standard deviation information for all distances between the vortex-shedding edges of the bluff body is formed from the distance information, and that by means of a multiple comparator 24, contour reference information is formed from the contour information and a contour limit value to be predetermined therefor, first roughness reference information from the first roughness information and a first roughness limit value to be predetermined therefor, second roughness reference information from the second roughness information and a second roughness limit value to be predetermined therefor, standard deviation reference information from the standard deviation information and a standard deviation limit value to be predetermined therefor, first cross-correlation reference information from the first cross-correlation information and a first cross-correlation limit value to be predetermined therefor, second cross-correlation reference information from the second cross-correlation information and a second cross-correlation limit value to be predetermined therefor, first surface defect reference information from the first surface defect information and a first surface defect limit value to be predetermined therefor, second surface defect reference information from the second surface defect information and a second surface defect limit value to be predetermined therefor, third surface defect reference information from the third surface defect information and a third surface defect limit value to be predetermined therefor, and fourth surface defect reference information from the fourth surface defect information and a fourth surface defect limit value to be predetermined therefor. The calibration factor information, the dimension information, the first roughness reference information, the second roughness reference information, the standard deviation reference information, the first cross-correlation reference information, the second cross-correlation reference information, the first surface defect reference information, the second surface defect reference information, the third surface defect reference information, and the fourth surface defect reference information are processed into quality factor information and/or quality information.

To do this, the averager 19 forms from the distance signal a1 a standard deviation signal s for all distances between the vortex-shedding edges of the bluff body 7.

The following signals are applied to the multiple comparator 24: the contour signal p and a contour limit value signal gp to be predetermined therefor, the first roughness signal r1 and a first roughness limit value signal gr1 to be predetermined therefor, the second roughness signal r2 and a second roughness limit value signal gr2 to be predetermined therefor, the standard deviation signal s and a standard deviation limit value signal gs to be predetermined therefor, the first cross-correlation signal kr1 and a first cross-correlation limit value signal gkr1 to be predetermined therefor, the second cross-correlation signal kr2 and a second cross-correlation limit value signal gkr2 to be predetermined therefor, the first surface defect signal d1 and a first surface defect limit value signal gd1 to be predetermined therefor, the second surface defect signal d2 and a second surface defect limit value signal gd2 to be predetermined therefor, the third surface defect signal d3 and a third surface defect limit value signal gd3 to be predetermined therefor, and the fourth surface defect signal d4 and a fourth surface defect limit value signal gd4 to be predetermined therefor.

From each of the pairs of signals g, gp; s, gs; r1, gr1; r2, gr2, kr1, gkr1; kr2, gkr2; d1, gd1; d2, gd2; d3, gd3; d4, gd4, the multiple comparator 24 derives an associated reference signal; these reference signals are: a contour reference signal vp, a standard deviation reference signal vs, a first roughness signal vr1, a second roughness reference signal vr2, a first cross-correlation reference signal vkr1, a second cross-correlation reference signal vkr2, a first surface defect reference signal vd1, a second surface defect reference signal vd2, a third surface defect reference signal vd3, and a fourth surface defect reference signal vd4.

Finally, the following signals are fed to a microprocessor 25: the calibration factor signal kf, the dimension signal ds, the contour reference signal vp, the standard deviation reference signal vs, the first roughness reference signal vr1, the second roughness reference signal vr2, the first cross-correlation reference signal vkr1, the second cross-correlation reference signal vkr2, the first surface defect reference signal vd1, the second surface defect reference signal vd2, the third surface defect reference signal vd3, and the fourth surface defect reference signal vd4.

The microprocessor 25 processes the applied signals into a quality factor signal qf and/or a quality signal q. These signals are used in a suitable manner when measuring and testing each produced vortex sensor. The signals q, qf serve to screen out devices lying outside the aforementioned limit values, since they are unfit for use.

What is claimed is:

1. A method of dry-calibrating vortex flow sensors (henceforth called "vortex sensors" for short) each comprising:

a measuring tube of predetermined length having a lumen
through which a fluid whose volumetric flow rate is to be measured flows during operation, and
which has an axis,
an internal surface,
an inlet end, which forms a contour line with the lumen,
an outlet end,
a bore size corresponding to a nominal bore, and
a wall thickness suitable for a permissible pressure of the fluid;

a bluff body
which has a cross-sectional area with a geometrical shape selectable by the manufacturer,
which has a first end connected with the wall of the measuring tube along a first fixing zone and
a second end connected with the wall of the measuring tube along a second fixing zone,
which has a surface facing fluid flow and having a first and a second vortex-shedding edge, and
which is disposed along a diameter of the measuring tube; and a sensing element
which is fitted in the bluff body or
which is mounted downstream of the bluff body on the internal or external surface of the wall of the measuring tube or in said wall, said method comprising the steps of:

producing, by means of a high-resolution electronic camera located on the axis in front of the measuring tube, in the direction of fluid flow, a digitized, two-dimensional overall image of the internal surface of the measuring tube in the area of the bluff body, the bluff body, the two fixing zones, and the contour line of the inlet end;

dividing the overall image into a first, a second, and a third partial image,
the first partial image containing virtually only information about the inlet end and the internal surface,
the second partial image containing virtually only information about the bluff body without the fixing zones, and
the third partial image containing virtually only information about the fixing zones;

extracting from the first partial image
contour information about the contour line and
first surface defect information relating to the internal surface of the measuring tube;

extracting from the second partial image
first edge information about the first vortex-shedding edge of the bluff body,
second edge information about the second vortex-shedding edge of the bluff body, and
second surface defect information relating to the surface of the bluff body facing fluid flow;

extracting from the third partial image
  first shape information about the first fixing zone of the bluff body,
  second shape information about the second fixing zone of the bluff body,
  third surface defect information relating to the surface of the first fixing zone, and
  fourth surface defect information relating to the surface of the second fixing zone;
forming from the first and second edge information
  distance information and
  angle information relating to the deviation of the vortex-shedding edges of the bluff body from parallelism;
forming from the distance information
  first roughness information relating to the not exactly straight course of the first vortex-shedding edge,
  second roughness information relating to the not exactly straight course of the second vortex-shedding edge,
  mean-value information for all distances between the vortex-shedding edges along the bluff body, and
  weighting information using a weighting function characteristic of predetermined flow profiles of the fluid;
forming first cross-correlation information from the first shape information and from first ideal information characteristic of the ideal shape of the first fixing zone, and
forming second cross-correlation information from the second shape information and from second ideal information characteristic of the ideal shape of the second fixing zone; and
processing in a neural network
  the contour information,
  the first and second roughness information,
  the mean-value information,
  the weighting information,
  the angle information,
  the first, second, third, and fourth surface defect information, and
  the first and second cross-correlation information
together with respective standard information corresponding to said information and derived from a plurality of wet calibrations into at lease one of
  calibration factor information and
  dimension information about the geometrical dimensions of the calibrated vortex sensor.

2. A method as claimed in claim 1, comprising the steps of:
forming from the distance information standard deviation information relating to all distances between the vortex-shedding edges of the bluff body;
forming by means of a multiple comparator
  contour reference information from the contour information and a contour limit value to be predetermined therefor,
  first roughness reference information from the first roughness information and a first roughness limit value to be predetermined therefor,
  second roughness reference information from the second roughness information and a second roughness limit value to be predetermined therefor,
  standard deviation reference information from the standard deviation information and a standard deviation limit value to be predetermined therefor,
  first cross-correlation reference information from the first cross-correlation information and a first cross-correlation limit value to be predetermined therefor,
  second cross-correlation reference information from the second cross-correlation information and a second cross-correlation limit value to be predetermined therefor,
  first surface defect reference information from the first surface defect information and a first surface defect limit value to be predetermined therefor,
  second surface defect reference information from the second surface defect information and a second surface defect limit value to be predetermined therefor,
  third surface defect reference information from the third surface defect information and a third surface defect limit value to be predetermined therefor, and
  fourth surface defect reference information from the fourth surface defect information and a fourth surface defect limit value to be predetermined therefor; and
processing the calibration factor information,
  the dimension information,
  the contour reference information,
  the standard deviation reference information,
  the first roughness reference information,
  the second roughness reference information,
  the first cross-correlation reference information,
  the second cross-correlation reference information,
  the first surface defect reference information,
  the second surface defect reference information,
  the third surface defect reference information, and
  the fourth surface defect reference information into at lease one of quality information and quality factor information.

3. A method as claimed in claim 1 wherein:
the bluff body has, in addition to the first and second vortex-shedding edges, a third and a fourth vortex-shedding edge;
from the distance information,
  third roughness information relating to the not exactly straight course of the third vortex-shedding edge and
  fourth roughness information relating to the not exactly straight course of the fourth vortex-shedding edge
is formed; and
in the neural network, the third and fourth roughness information is processed together with corresponding standard information derived from a plurality of wet calibrations into at lease one of the calibration factor information and the distance information.

4. A method as claimed in claim 2 wherein:
the bluff body has, in addition to the first and second vortex-shedding edges, a third and a fourth vortex-shedding edge;
from the distance information,
  third roughness information relating to the not exactly straight course of the third vortex-shedding edge and
  fourth roughness information relating to the not exactly straight course of the fourth vortex-shedding edge
is formed; and
in the neural network, the third and fourth roughness information is processed together with corresponding standard information derived from a plurality of wet calibrations into at lease one of the calibration factor information and the distance information.

* * * * *